United States Patent

[11] 3,619,617

| [72] | Inventor | Alfred Kolb<br>Haus am Tannenberg, Wertheim(Main), Germany |
|---|---|---|
| [21] | Appl. No. | 843,965 |
| [22] | Filed | July 23, 1969 |
| [45] | Patented | Nov. 9, 1971 |
| [32] | Priority | July 26, 1968 |
| [33] | | Germany |
| [31] | | P 17 52 859.5 |

[54] PROJECTED IMAGE GRINDING MACHINE
4 Claims, 4 Drawing Figs.

[52] U.S. Cl................................................. 250/202,
51/165.72, 250/226, 356/166, 356/174
[51] Int. Cl................................................. G05b 1/00
[50] Field of Search................................................. 250/202,
226; 356/166, 174; 51/165.72

[56] References Cited
UNITED STATES PATENTS

| 3,128,383 | 4/1964 | Brouwer | 250/202 |
| 3,264,932 | 8/1966 | Hendricks | 356/165 |
| 3,495,089 | 2/1970 | Brown | 250/202 X |
| 3,510,658 | 5/1970 | Rabedeau | 250/226 X |

*Primary Examiner*—James W. Lawrence
*Assistant Examiner*—C. M. Leedom
*Attorney*—Christen, Sabol & O'Brien ABSTRACT: The tool of a grinding machine is guided by a color-sensitive photoelectric sensor which scans an image of the actual shape of a workpiece in one color superimposed on an image of the desired shape of the workpiece in another color complementary to said one color.

PROJECTED IMAGE GRINDING MACHINE

This invention relates to an automatic projected-image grinding machine where, by means of optical systems and of color filters placed in the illuminating beam, a multicolored mixed image of true shape, workpiece and grinding disk is projected on a screen, and control of the grinding wheel working the workpiece in the rough takes place with the use of a photoelectric cell, which scans the developing colored boundary line in the mixed image at the slightest overgrinding of the workpiece beyond the true shape image.

In the case of projected-image grinders of the above-mentioned variety (see German Pat. No. 1 139 769), a distinct colored boundary line between the true shape and the ground workpiece will be produced on a screen as long as the grinding is still within the framework of the permissible tolerances beyond the measure of the true shape. The colored boundary line showing in the enlarged representation on the screen can be used for the purpose of acting upon one or several photoelectric cells calibrated in colors so that the photoelectric cells can assume the control of the machine on the basis of the light impulses received. This method of control of the grinder has the advantage, in comparison to other designs, that the wear of the grinding disk, which is unavoidable in the course of the working, will always be taken into consideration automatically because of the existence of the colored boundary line which coincides with the line of the true shape.

In the case of known machines of this type, visual observation of the progress of grinding and the scanning of the colored boundary line by the photoelectric cell takes place on one and the same screen. As a result of that, certain difficulties can result because, on the one hand, the optical beam and its adjusting mechanism may be obscured and, on the other hand, the visual image of the grinding disk—particularly when the latter is very broad—which is indispensable for visual observation of the projection screen, may affect the precise scanning of the source of the colored boundary line through the photoelectric cell.

It is the task of the invention to eliminate the shortcomings just described and to propose a fully automatic control for a projected image grinder, so that simultaneously an unimpeded visual observation of the entire progress of processing and, on the other hand, a precise unobscured control of the grinding disk by means of the photoelectric cell will be assured.

According to the invention, this task will be solved through the fact that, beside the customary projection screen serving for the visual observation of the progress of processing, a special control projection screen is provided on which the mixed image is projected of only a partial area of the true shape and that the photoelectric cell will scan the colored boundary line projected in the pertinent partial area on the control projection screen. At the same time, for the projection of the partial area of the true shape on the control projection screen, a special reference drawing of the true shape may be provided.

It will be of advantage if the projection of the point of application of the grinding disk on the workpiece on the control projection screen takes place by means of incident light in order to avoid an image formation of the grinding disk on the control projection screen, in which case any possibly existing transmitted light caused by the tool is kept away from the control projection screen through polarizing filters. In that case, the source of the colored boundary line on the control projection screen lies completely unobscured and can be scanned with a high degree of precision by the photoelectric cell.

In a preferred form of the invention, provision is made for the optical system projecting the line of the true shape onto a control projection screen to be rigidly connected with the carrier of the photoelectric cell which is movable in accordance with a system of two coordinates, whereby reference drawing of the line of the true shape will lie in the same plane with the control projection screen.

The subsequent description of preferred designs of the invention serves for a further explanation in connection with the attached drawing.

Figure 1:
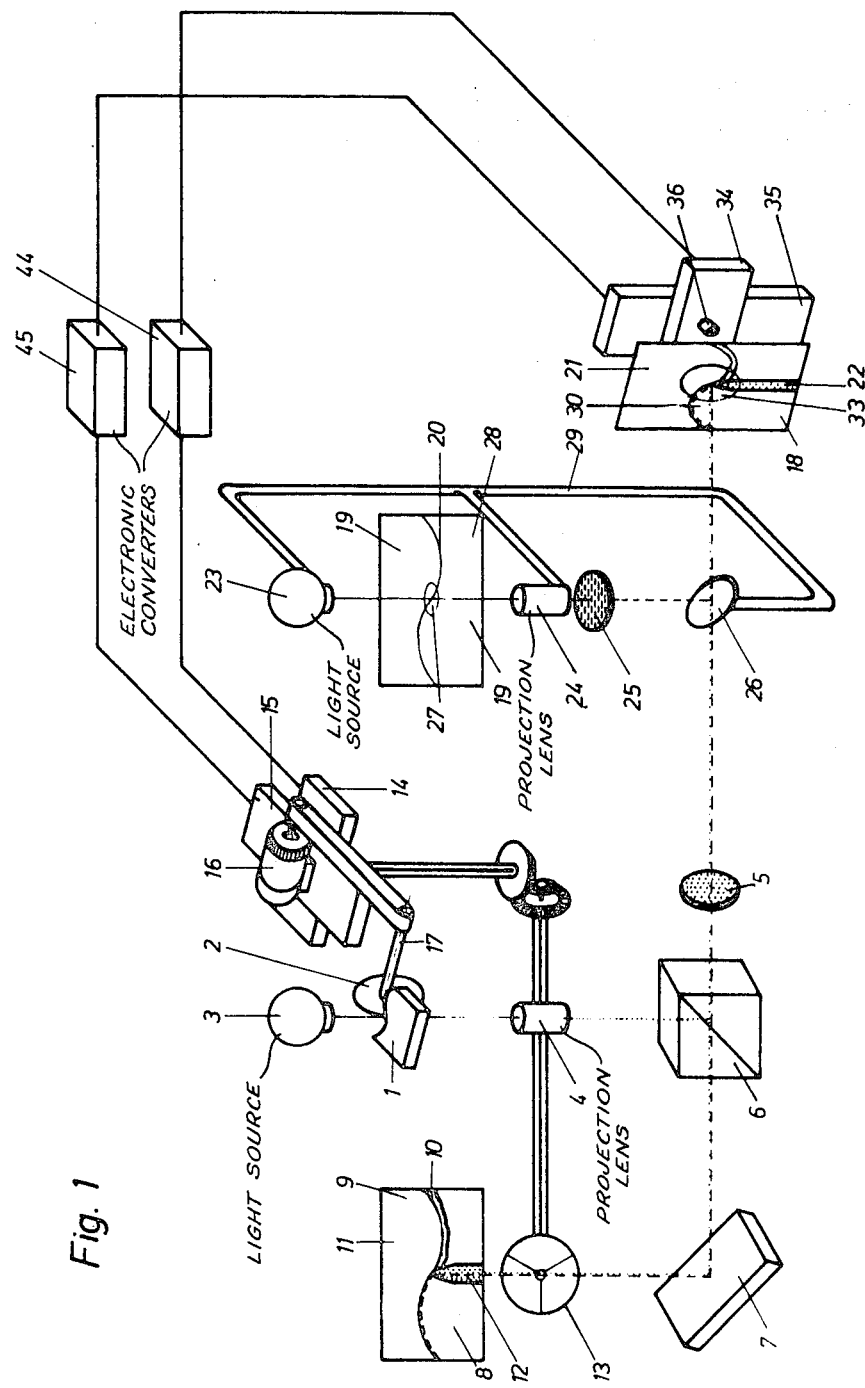
FIG. 1 shows a schematic arrangement of the essential elements of a preferred form projected-image grinder according to the invention.

In the case of the projected-image grinder shown diagrammatically in FIG. 1, a workpiece 1 and a grinding disk 2, processing said workpiece, is projected by a source of light 3 via a projection lens 4, a beam-splitting prism 6 and a reflecting mirror 7 onto a visual projection screen 8. On the projection screen 8, the copy of a drawing 9, with the desired shape 10 drawn on the desired enlarged scale, is attached in such a way that the image 11 of the workpiece 1 and the image 12 of the grinding disk 2 are superposed with the desired shape 10.

A manual drive of cross slides 14 and 15 is accomplished by means of the control wheel 13, for example, with the use of differential gears or synchros, on which cross slides a grinding-wheel gear 16 is placed for the drive and the movement of the stroke of a spindle 17, bearing the grinding disk 2.

A partial image is branched off by the beam-splitting prism 6, which, after passing through a color filter 5 (for example, red), will project an enlarged image of the workpiece 1 and the grinding disk 2, corresponding to the image on the projection screen 8, onto a control projection screen 18. The image of the workpiece 1 projected on the control projection screen 18 is designated by numeral 21, and the image of the grinding disk 2 by numeral 22.

A transparent reference tracing 19, made from a copy of the drawing 9 in the projection screen 8, and containing the desired shape 20 is inserted, into a reference frame 28. A source of light 23 projects a partial area 27 of this desired shape drawing via a projection lens 24, which corresponds to the projection lens 4, onto an analogous partial area 33 on the control projection screen 18. In that case, the course of the rays passes through a color filter 25 (for example, green) which is complementary to the color filter 5, and through a small semireflecting plate, or mirror, 26, which permits the rays coming from the beam-splitting prism 6 to pass through to the control screen 18. The source of light 23, the projection lens 24, the complementary color filter 25 and the small plate 26 are connected into a rigid system by means of a mounting support 29, which rigid system is moved together with the photoelectric cell 36, scanning the image on the control projection screen 18, in a conventional manner (not shown) because it is connected for movement with the carrier of said photoelectric cell.

Figure 2:
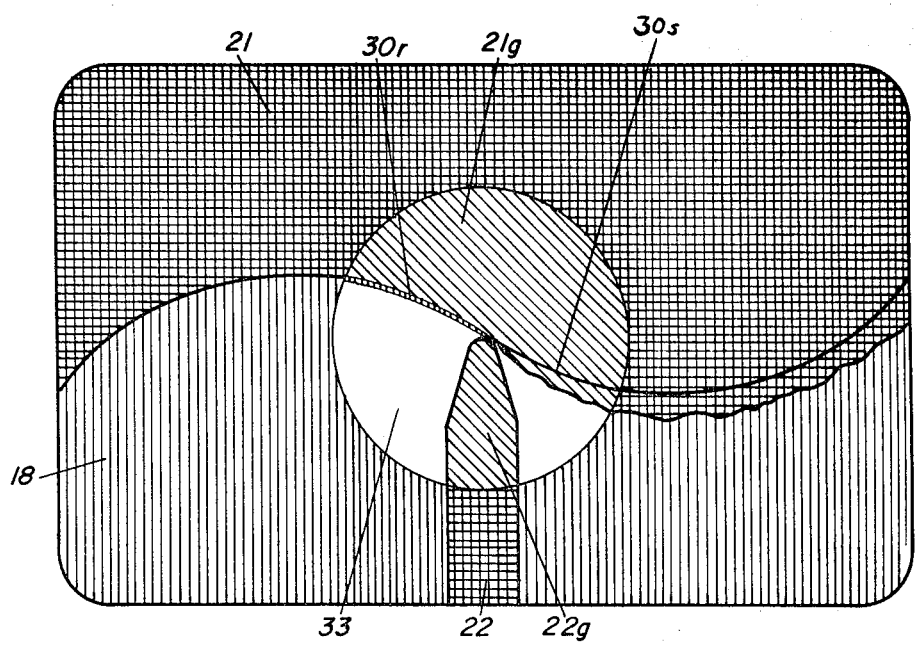
FIG. 2 shows a control picture screen for the arrangement of FIG. 1.

On the control projection screen 18, a mixed image projected by the two lenses 4 and 24 via the complementary color filters 5 and 25, is displayed in the partial area 33, which mixed image is shown on an enlarged scale in FIG. 2. In the partial area 33, the pictures 21g and 22g of the workpiece 1 or the grinding disk 2 appear green on a white field. The picture 30s of the desired true shape line 20, superposed on the image 21g of the workpiece, appears in black in the part of the workpiece that has not yet been ground away by the grinding disk. There, where the workpiece has already been worked down into conformity with the line of the desired shape, this true shape, conforming with the contour of the ground workpiece, appears as a red boundary line 30r.

A red-sensitive photoelectric cell 36 is arranged on two cross slides 34 and 35, which cell follows the red boundary line 30r, developing along the line of the desired shape, with the help of a conventional electronic switching and control mechanism (not shown). This effect is utilized in a known manner for the follower control of the cross slides 14 and 15, carrying the grinding disk 1, whereby a reduction of the amount of movement of the feed path of the slides 14 and 15, necessary because of the enlargement of the projected images, is compensated for electronically through interposed converters 44 and 45.

Figure 4:
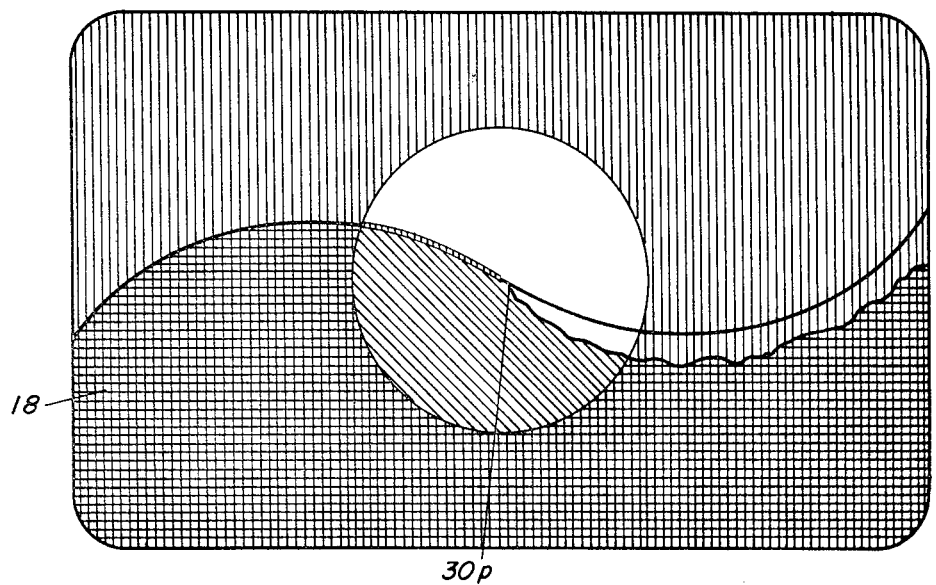
FIG. 4 shows a control projection screen for the design of FIG. 3.

Since the grinding disk does not always maintain its sharp form because of the wear occurring during the processing of the workpiece or because it may be made intentionally with a relatively broad surface, the precise scanning of the projected colored boundary line on the control projection screen by the photoelectric cell 36 can be impaired because of the image of the grinding disk projected onto this screen, and for the reason that the image of the grinding disk may obscure the desired shape precisely at the originating location of the colored boundary line. This difficulty may be eliminated through a modified form of the invention according to FIG. 3 and 4.

Figure 3:
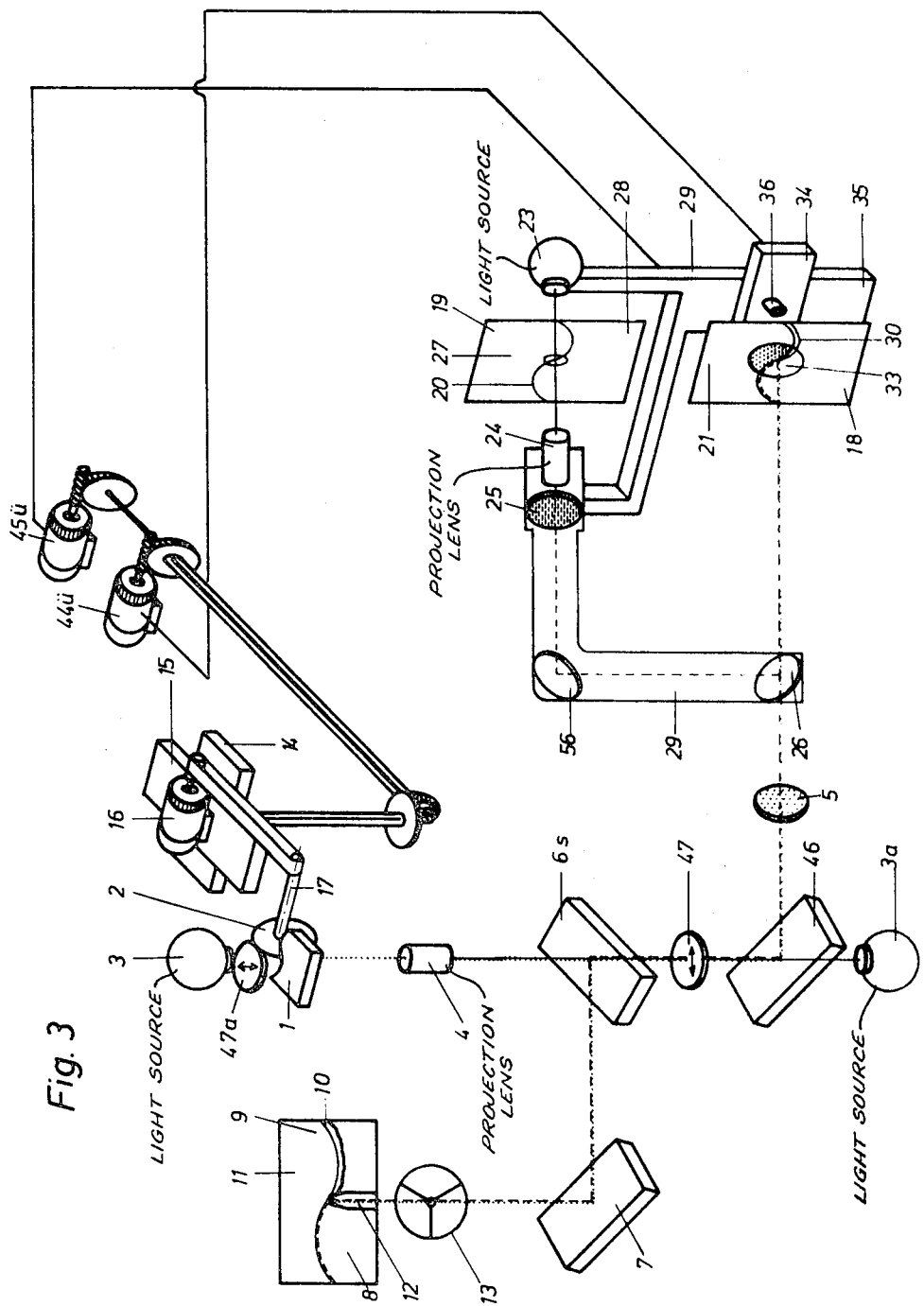
FIG. 3 is a modified schematic design of the invention.

Only an incident light image of the place of contact of workpiece 1 and grinding disk 2 will be projected onto the control picture screen 18 with the changed light path of FIG. 3 for the purpose of defining the red boundary line. As is well known, this has the advantage that, in that case, the grinding disk 2 will not be projected. Consequently, the result is, as becomes clear from FIG. 4 and in contrast to FIG. 2, a marked point 30p, which is not covered by any image of the grinding disk and which is arranged precisely at the point of application of the grinding disk on the workpiece and can be scanned without impediment by the photoelectric cell 36.

Between the design of the invention according to FIG. 1 and the one according to FIG. 3, the following differences exist:

In addition to the transmitted-light illumination introduced by the source of light 3, an incident light illumination by an additional light source 3a occurs in FIG. 3. In place of the beam-splitting prism 6, of FIG. 1, a semireflecting mirror 6s is provided. Between the light source 3a and the reflecting mirror 6s, a semireflecting mirror 46 is arranged. In case the contact of the grinding disk 2 on the workpiece 1 is to be observed on the projection screen 8 by transmitted light resulting from illumination by the light source 3, two crossed-polarization filters 47 and 47a can be placed in the light path in the manner shown in the drawing. As a result it will prevent an image of the grinding disk 2 from being projected onto the control projection screen 18 despite the transmitted illumination by the light source 3.

This system, consisting essentially of the elements 6s and 46, which in FIG. 3 has replaced the beam-splitting prism 6, can also be replaced by other arrangements bringing about the same effect.

In the case of the design according to FIG. 3, the reference frame 28, furthermore, is arranged parallel to the control projection screen 18, whereby the projection light path for the desired shape 20 is reflected by means of a reflecting mirror 56. The arrangement can be utilized advantageously in the manner indicated in FIG. 3 for the purpose of coupling the projection system, consisting of the light source 23, lens 24, color filter 25, mirrors 56, and 26, electronically or rigidly with one of the two cross slides 34 or 35, forming the carrier for the photoelectric cell 36.

In FIG. 3, furthermore, and in contrast to FIG. 1, instead of an electronic reduction of the feed rates of the slides 14 and 15, the use of reduction gears 44U, 45U, is shown by way of example.

Finally, in the case of the projection image grinders according to the invention laser beam sources could be substituted for the light sources 3, 3a and possibly also 23, if this should be necessary because of the light intensity.

I claim:

1. In automatic projected-image grinding machines comprising a movable tool to grind a workpiece to a desired shape, a first projection screen, a second projection screen, first optical means for projecting an image of said tool and said workpiece on said first projection screen, second optical means, including a first color filter, for projecting an image of said workpiece in a first color on said second projecting screen, third optical means, including a transparent tracing of said desired shape and a second color filter of a complementary color to the color of said first color filter, for projecting an image of a portion of said desired shape on said second projection screen in said second complementary color to said first color, said image in said second color being superimposed on said image in said first color to provide a colored boundary line resulting at the points corresponding to the ones where said tool has ground said workpiece to said desired shape during the grinding operation of said workpiece, movable photoelectric means responsive to the color of said colored boundary line continuously scanning the originating point of said colored boundary line on said second projection screen, and control means responsive to said photoelectric means for moving said tool to produce said desired shape on said workpiece.

2. The apparatus defined in claim 1, wherein said second optical means includes a light source for projecting said image of the workpiece on said second projection screen by means of incident light, and said first optical means includes another light source for projecting an image of said workpiece and said tool on said first projection screen by means of transmitted light, and light-polarizing filter means for preventing projection of the image from said another light source on said second screen.

3. The apparatus defined in claim 1, wherein said third optical means includes a light source movable with said photoelectric means for projecting an image of the portion of said transparent tracing corresponding to the location of said movable tool.

4. The apparatus defined in claim 3, wherein said transparent tracing is disposed in a plane parallel with the plane of said second projection screen.

* * * * *